United States Patent
Jiang et al.

(10) Patent No.: US 12,282,100 B2
(45) Date of Patent: Apr. 22, 2025

(54) USER TERMINAL POSITIONING METHOD, DEVICE, AND SYSTEM

(71) Applicants: CHINA MOBILE SHANGHAI ICT CO., LTD., Shanghai (CN); CHINA MOBILE COMMUNICATIONS GROUP CO., LTD., Beijing (CN)

(72) Inventors: Xin Jiang, Beijing (CN); Wu Zhao, Beijing (CN); Hua Zou, Beijing (CN); Jian Wang, Beijing (CN); Hui Xu, Beijing (CN); Ting Ao, Beijing (CN)

(73) Assignees: CHINA MOBILE SHANGHAI ICT CO., LTD., Shanghai (CN); CHINA MOBILE COMMUNICATIONS GROUP CO., LTD., Beijing (CN)

( * ) Notice: Subject to any disclaimer, the term of this patent is extended or adjusted under 35 U.S.C. 154(b) by 376 days.

(21) Appl. No.: 17/759,097

(22) PCT Filed: Dec. 9, 2020

(86) PCT No.: PCT/CN2020/134914
§ 371 (c)(1),
(2) Date: Jul. 19, 2022

(87) PCT Pub. No.: WO2021/147543
PCT Pub. Date: Jul. 29, 2021

(65) Prior Publication Data
US 2023/0041480 A1   Feb. 9, 2023

(30) Foreign Application Priority Data
Jan. 21, 2020  (CN) .......................... 202010069444.6

(51) Int. Cl.
*G01S 19/07*  (2010.01)
*G01S 19/41*  (2010.01)
(Continued)

(52) U.S. Cl.
CPC ............ *G01S 19/071* (2019.08); *G01S 19/41* (2013.01); *G01S 19/09* (2013.01); *G01S 19/46* (2013.01); *H04L 67/10* (2013.01); *H04L 67/52* (2022.05)

(58) Field of Classification Search
CPC ........ G01S 19/41; G01S 19/071; G01S 19/09; G01S 19/46; G01S 5/0018; G01S 5/0036;
(Continued)

(56) References Cited

U.S. PATENT DOCUMENTS 11,460,583 B2 * 10/2022 Limberger .............. G01S 19/41
11,835,633 B1 * 12/2023 Hane ........................ G01S 19/31
(Continued)

FOREIGN PATENT DOCUMENTS

CN    101295014 A    10/2008
CN    101299065 A    11/2008
(Continued)

OTHER PUBLICATIONS

International Search Report in the international application No. PCT/CN2020/134914, mailed on Mar. 3, 2021.
(Continued)

*Primary Examiner* — Chuong P Nguyen
(74) *Attorney, Agent, or Firm* — Syncoda LLC; Feng Ma (57) ABSTRACT

A user terminal positioning method is used in an edge cloud server, and includes: receiving satellite positioning information sent by a user terminal; determining a location service area in which the user terminal is located; on the basis of the location service area, acquiring a differential correction model corresponding to the location service area from a public cloud server; using the satellite positioning information and the differential correction model to implement
(Continued)

location calculation to obtain location information of the user terminal; and sending the location information to the user terminal.

7 Claims, 9 Drawing Sheets

(51) Int. Cl.
    *G01S 19/09*     (2010.01)
    *G01S 19/46*     (2010.01)
    *H04L 67/10*     (2022.01)
    *H04L 67/52*     (2022.01)

(58) Field of Classification Search
    CPC ....... G01S 5/0054; H04L 67/52; H04L 67/10; H04W 4/02; Y02D 30/70
    USPC ............. 342/357.24, 357.44, 357.46, 357.29
    See application file for complete search history.

(56) References Cited

U.S. PATENT DOCUMENTS

| | | | |
|---|---|---|---|
| 2010/0149028 A1 | 6/2010 | Mermet | |
| 2021/0149060 A1* | 5/2021 | Limberger | ............ G01S 19/072 |
| 2023/0070349 A1* | 3/2023 | Chen | ........................ G01S 19/43 |

FOREIGN PATENT DOCUMENTS

| | | | | | |
|---|---|---|---|---|---|
| CN | 103823228 | A | * | 5/2014 | ............. G01S 19/41 |
| CN | 103852773 | A | * | 6/2014 | ............. G01S 19/34 |
| CN | 104793219 | A | * | 7/2015 | ............. G01S 19/07 |
| CN | 104977596 | A | * | 10/2015 | ............. G01S 19/07 |
| CN | 105334524 | A | | 2/2016 | |
| CN | 105785410 | A | * | 7/2016 | ............. G01S 19/42 |
| CN | 106019336 | A | | 10/2016 | |
| CN | 106569239 | A | | 4/2017 | |
| CN | 107797127 | A | | 3/2018 | |
| CN | 107820204 | A | | 3/2018 | |
| CN | 107872516 | A | | 4/2018 | |
| CN | 104977596 | B | | 8/2018 | |
| CN | 108513248 | A | | 9/2018 | |
| CN | 109150818 | A | | 1/2019 | |
| CN | 105785410 | B | | 5/2019 | |
| CN | 109951796 | A | | 6/2019 | |
| CN | 110095797 | A | | 8/2019 | |
| CN | 111090111 | A | * | 5/2020 | ............. G01S 19/41 |
| CN | 107222468 | B | * | 12/2020 | ......... H04L 67/1021 |
| CN | 113050139 | A | * | 6/2021 | ............. G01S 19/43 |
| EP | 3035080 | A1 | | 6/2016 | |
| JP | 2011237314 | A | | 11/2011 | |
| WO | 2010057149 | A1 | | 5/2010 | |
| WO | WO-2019162877 | A1 | * | 8/2019 | ............. G01S 19/40 |

OTHER PUBLICATIONS

Written Opinion of the International Search Authority in the international application No. PCT/CN2020/134914, mailed on Mar. 3, 2021.
Supplementary European Search Report in the European application No. 20915919.3, mailed on Jan. 26, 2024. 7 pages.

* cited by examiner

USER TERMINAL POSITIONING METHOD, DEVICE, AND SYSTEM

CROSS-REFERENCE TO RELATED APPLICATIONS

This application is a U.S. national stage of International Patent Application No. PCT/CN2020/134914 filed on Dec. 9, 2020, which claims priority to Chinese Patent Application No. 202010069444.6 filed on Jan. 21, 2020. The disclosures of the above-referenced applications are hereby incorporated by reference in their entirety.

TECHNICAL FIELD

The disclosure belongs to the technical field of high-precision positioning, and in particular to a user terminal positioning method, an edge cloud server, a public cloud server, a user terminal, and a system.

BACKGROUND

Satellite positioning technology means that a terminal calculates a coordinate location thereof by receiving a navigation signal broadcast by a satellite. The precision of the positioning technology is affected by ionosphere, troposphere, clock error and other factors. A ground-based satellite augmentation system is to build a reference station network at a known location to continuously observe the satellite navigation signal and transmit observed data back to a high-precision positioning platform. The high-precision positioning platform calculates location correction information of the whole network according to an observed value and a real value of the reference station network. The positioning terminal may calculate the high-precision location information thereof by observing the satellite navigation signal and receiving location correction information of an area where the positioning terminal is located.

A network architecture of the high-precision positioning system in the related art is designed for wide-area service coverage (such as the whole country, the whole province, and the whole city). In the face of some local, closed and mobile service scenarios (such as mining areas and forest areas), if a unified wide-area service architecture design is still adopted, the positioning service quality will be affected and the service construction and maintenance costs will be increased.

Therefore, how to improve the positioning precision of a user terminal is a technical problem that those skilled in the art need to solve urgently.

SUMMARY

Embodiments of the disclosure provide a user terminal positioning method, an edge cloud server, a public cloud server, a user terminal, and a system, which can improve the positioning accuracy of the user terminal.

According to a first aspect, a user terminal positioning method is provided, which is applied to an edge cloud server and includes the following operations.

Satellite positioning information is received from a user terminal.

A location service area where the user terminal is located is determined.

A differential correction model corresponding to the location service area is acquired from a public cloud server according to the location service area.

Location calculation is performed using the satellite positioning information and the differential correction model to obtain location information of the user terminal.

The location information is sent to the user terminal.

Optionally, the operation of acquiring the differential correction model corresponding to the location service area from the public cloud server according to the location service area includes the following operations.

A location service area request corresponding to the location service area is sent to the public cloud server.

The differential correction model corresponding to the location service area is received from the public cloud server.

According to a second aspect, a user terminal positioning method is provided, which is applied to a public cloud server and includes the following operations.

A location service area request is received from an edge cloud server.

The location service area request is parsed and a location service area corresponding to the location service area request is determined.

A differential correction model corresponding to the location service area is matched according to the location service area.

The differential correction model is sent to the edge cloud server such that the edge cloud server determines location information of a user terminal according to the differential correction model.

Optionally, before the differential correction model corresponding to the location service area is matched according to the location service area, the following operations may further be included.

A satellite observation data packet is received from a ground-based augmentation reference station network.

The satellite observation data packet is parsed to obtain respective observation data of each reference station in the ground-based augmentation reference station network.

A coverage area of the ground-based augmentation reference station network is divided to obtain a preset number of grid coverage areas.

A differential correction model of any grid coverage area is determined according to observation data and accurate location coordinates of a reference station in the grid coverage area.

Optionally, the operation of matching the differential correction model corresponding to the location service area according to the location service area may include the following operations.

Based on the location service area, a grid coverage area to which the location service area belongs is determined.

According to the grid coverage area to which the location service area belongs, the differential correction model corresponding to the location service area is matched.

According to a third aspect, a user terminal positioning method is provided, which is applied to a user terminal and includes the following operations.

Satellite positioning information is received from a satellite.

The satellite positioning information is sent to an edge cloud server to acquire location information of the user terminal.

According to a fourth aspect, an edge cloud server is provided, which includes:

a satellite positioning information receiving module, a location service area determination module, a differential correction model acquisition module, a location calculation module, and a location information sending module.

The satellite positioning information receiving module is configured to receive satellite positioning information from a user terminal.

The location service area determination module is configured to determine a location service area where the user terminal is located.

The differential correction model acquisition module is configured to acquire a differential correction model corresponding to the location service area from a public cloud server according to the location service area.

The location calculation module is configured to perform location calculation using the satellite positioning information and the differential correction model to obtain location information of the user terminal.

The location information sending module is configured to send the location information to the user terminal.

Optionally, the differential correction model acquisition module may include a location service area request sending unit and a differential correction model receiving unit.

The location service area request sending unit is configured to send a location service area request corresponding to the location service area to the public cloud server.

The differential correction model receiving unit is configured to receive the differential correction model corresponding to the location service area from the public cloud server.

According to a fifth aspect, a public cloud server is provided, which includes: a location service area request receiving module, a location service area request parsing module, a differential correction model matching model, and a differential correction model sending module.

The location service area request receiving module is configured to receive a location service area request from an edge cloud server.

The location service area request parsing module is configured to parse the location service area request and determine a location service area corresponding to the location service area request.

The differential correction model matching module is configured to match a differential correction model corresponding to the location service area according to the location service area.

The differential correction model sending module is configured to send the differential correction model to the edge cloud server such that the edge cloud server determines location information of a user terminal according to the differential correction model.

Optionally, the public cloud server may further include: a satellite observation data packet receiving module, a satellite observation data packet parsing module, a coverage area division module, and a differential correction model determination module.

The satellite observation data packet receiving module is configured to receive a satellite observation data packet from a ground-based augmentation reference station network.

The satellite observation data packet parsing module is configured to parse a satellite observation data packet to obtain respective observation data of each reference station in the ground-based augmentation reference station network.

The coverage area division module is configured to divide a coverage area of the ground-based augmentation reference station network to obtain a preset number of grid coverage areas.

The differential correction model determination module is configured to determine a differential correction model of any grid coverage area according to observation data and accurate location coordinates of a reference station in the grid coverage area.

Optionally, the differential correction model matching module may include: a grid coverage area determination unit, and a differential correction model matching unit.

The grid coverage area determination unit is configured to determine, based on the location service area, a grid coverage area to which the location service area belongs.

The differential correction model matching unit is configured to match, according to the grid coverage area to which the location service area belongs, the differential correction model corresponding to the location service area.

According to a sixth aspect, a user terminal is provided, which includes a satellite positioning information receiving module and a satellite positioning information sending module.

The satellite positioning information receiving module is configured to receive satellite positioning information from a satellite.

The satellite positioning information sending module is configured to send the satellite positioning information to an edge cloud server to acquire location information of the user terminal.

According to a seventh aspect, a user terminal positioning system is provided, and the system includes an edge cloud server, a public cloud server and a user terminal. Herein, the edge cloud server is configured to execute the user terminal positioning method of the first aspect. The public cloud server is configured to execute the user terminal positioning method of the second aspect. The user terminal is configured to execute the user terminal positioning method of the third aspect.

According to the user terminal positioning method, the edge cloud server, the public cloud server, the user terminal and the system in the embodiments of the disclosure, the positioning precision of the user terminal can be improved. In the user terminal positioning method, the differential correction model corresponding to the location service area is acquired from the public cloud server according to the location service area where the user terminal is located. Since the differential correction model corresponds to the location service area where the user terminal is located, the satellite positioning information and the differential correction model are used to perform location calculation to obtain the location information of the user terminal, which can improve the positioning precision of the user terminal.

BRIEF DESCRIPTION OF THE DRAWINGS

In order to more clearly explain the technical solutions in the embodiments of the disclosure, the drawings required in the embodiments of the disclosure will be briefly introduced below. Those of ordinary skill in the art may also obtain other drawings in accordance with these drawings without paying creative work.

DETAILED DESCRIPTION

Features and exemplary embodiments of various aspects of the present disclosure will be described in detail below. To make the objectives, technical solutions, and advantages of the present disclosure clearer, the present disclosure is described below in detail with reference to the accompanying drawings and specific embodiments. It is to be understood that the specific embodiments described herein are only configured to explain the disclosure and not configured to limit the disclosure. For those skilled in the art, the present disclosure may be implemented without some of these specific details. The following description of the embodiments is only to provide a better understanding of the present disclosure by showing examples of the disclosure.

It is to be noted that relational terms such as first and second herein are only used to distinguish one entity or operation from another entity or operation, and do not necessarily require or imply any such actual relationship or sequence between these entities or operations. Moreover, terms "include" and "contain" or any other variant are intended to cover nonexclusive inclusions herein, so that a process, method, goods or device including a series of elements not only includes those elements but also includes other elements which are not clearly listed or further includes elements intrinsic to a process, a method, article or device. Under the condition of no more limitations, an element defined by the statement "including a/an . . . " does not exclude existence of the same other elements in a process, method, article or device including the element.

A network architecture of the high-precision positioning system in the related art is designed for wide-area service coverage (such as the whole country, the whole province and the whole city). In the face of some local, closed and mobile service scenarios (such as mining areas and forest areas), if a unified wide-area service architecture design is still adopted, the positioning service quality will be affected and the service construction and maintenance costs will be increased.

In order to solve related technical problems, the embodiments of the disclosure provide a user terminal positioning method, an edge cloud server, a public cloud server, a user terminal, and a system. The user terminal positioning method provided by the embodiments of the present disclosure is first introduced below.

Figure 1:
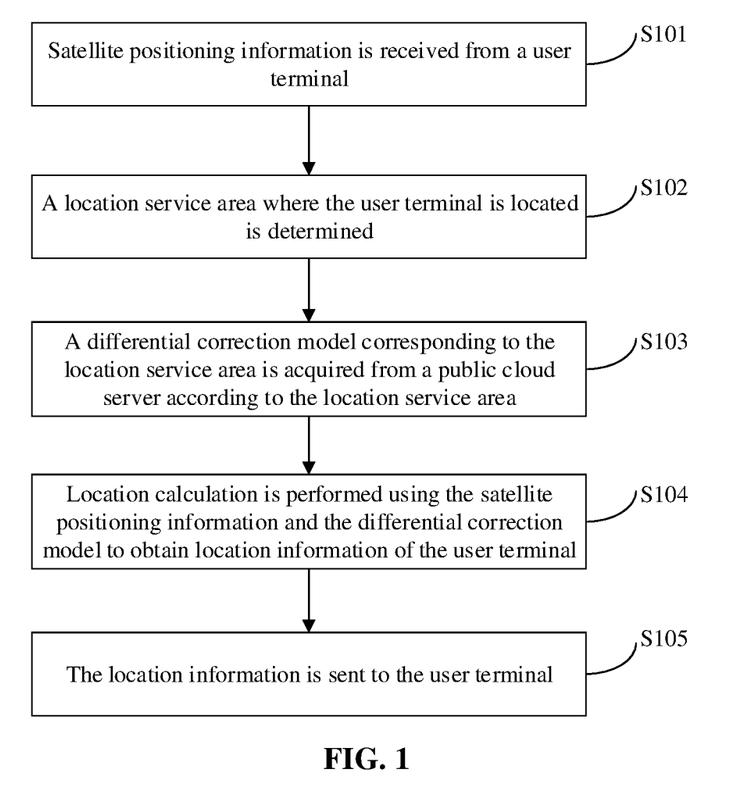
FIG. 1 is a flowchart of a user terminal positioning method according to an embodiment of the disclosure.

FIG. 1 is a flowchart of a user terminal positioning method according to an embodiment of the disclosure. As shown in FIG. 1, the user terminal positioning method is applied to an edge cloud server and includes the following operations.

At S101, satellite positioning information is received from a user terminal.

As S102, a location service area where the user terminal is located is determined.

At S103, a differential correction model corresponding to the location service area is acquired from a public cloud server according to the location service area.

In an embodiment, the operation of acquiring the differential correction model corresponding to the location service area from the public cloud server according to the location service area includes that: a location service area request corresponding to the location service area is sent to the public cloud server; and the differential correction model corresponding to the location service area sent by the public cloud server is received.

At S104, location calculation is performed using the satellite positioning information and the differential correction model to obtain location information of the user terminal.

At S105, the location information is sent to the user terminal.

After acquiring the differential correction model corresponding to the location service area, the edge cloud server uses the satellite positioning information and the differential correction model to perform location calculation to obtain the location information of the user terminal, and sends the location information to the user terminal.

Figure 2:
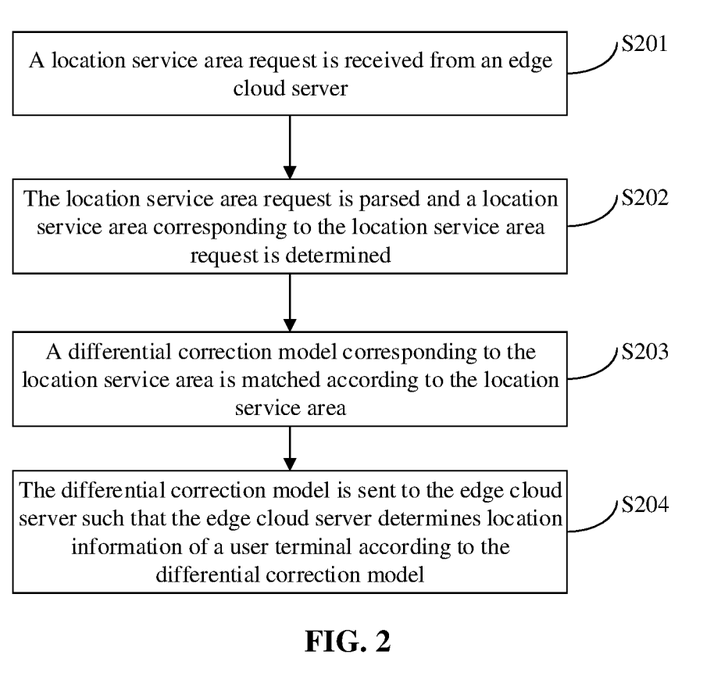
FIG. 2 is a flowchart of another user terminal positioning method according to an embodiment of the disclosure.

FIG. 2 is a flowchart of another user terminal positioning method according to an embodiment of the disclosure. As shown in FIG. 2, the user terminal positioning method is applied to a public cloud server, which includes the following operations.

At S201, a location service area request is received from an edge cloud server.

At S202, the location service area request is parsed and a location service area corresponding to the location service area request is determined.

At S203, a differential correction model corresponding to the location service area is matched according to the location service area.

In an embodiment, before matching the differential correction model corresponding to the location service area according to the location service area, the method includes the following operations. A satellite observation data packet sent by a ground-based augmentation reference station network is received; the satellite observation data packet is parsed to obtain respective observation data of each reference station in the ground-based augmentation reference station network; a coverage area of the ground-based augmentation reference station network is divided to obtain a preset number of grid coverage areas; and a differential correction model of any grid coverage area is determined according to observation data and accurate location coordinates of a reference station in the grid coverage area.

In an embodiment, the operation of matching the differential correction model corresponding to the location service area according to the location service area may include that: a grid coverage area to which the location service area belongs is determined based on the location service area; and the differential correction model corresponding to the location service area is matched according to the grid coverage area to which the location service area belongs.

At S204, the differential correction model is sent to the edge cloud server such that the edge cloud server determines location information of a user terminal according to the differential correction model.

Figure 3:
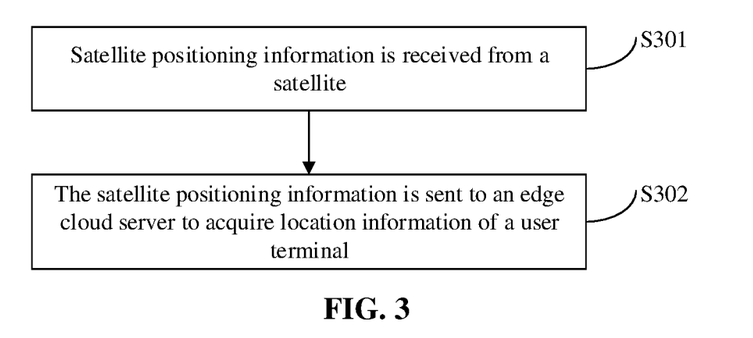
FIG. 3 is a flowchart of yet another user terminal positioning method according to an embodiment of the disclosure.

FIG. 3 is a flowchart of yet another user terminal positioning method according to an embodiment of the disclosure. As shown in FIG. 3, the user terminal positioning method is applied to a user terminal, which includes the following operations.

At S301, satellite positioning information is received from a satellite.

At S302, the satellite positioning information is sent to an edge cloud server to acquire location information of the user terminal.

The above content will be explained with a specific example as follows.

Figure 4:
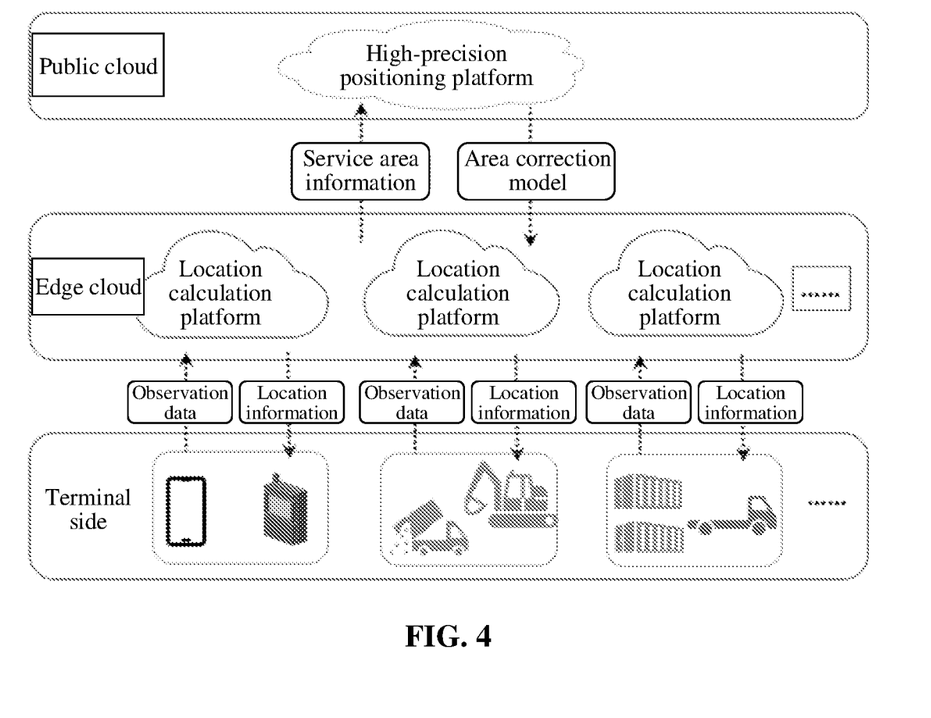
FIG. 4 is a schematic diagram of architecture of a high-precision positioning system based on edge cloud technology according to an embodiment of the disclosure.
Figure 5:
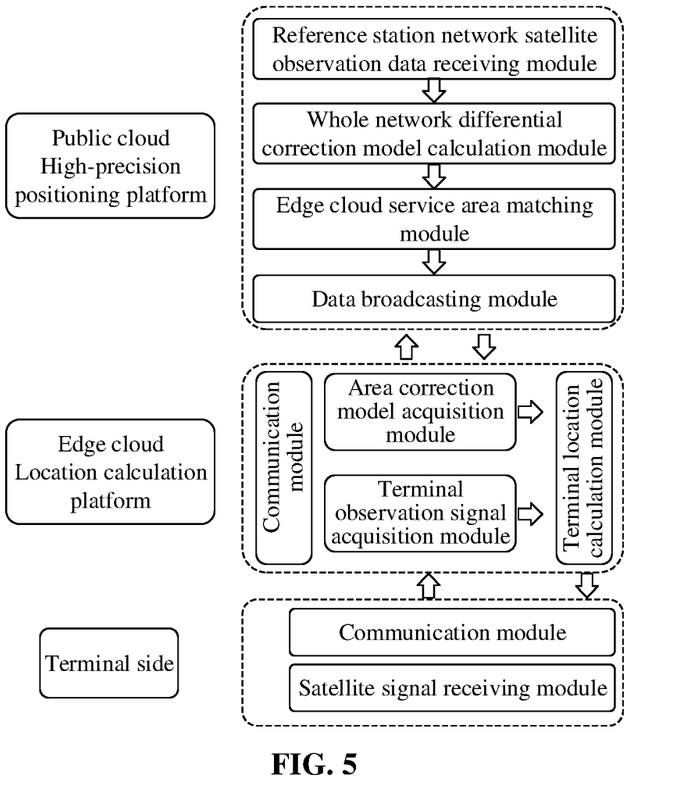
FIG. 5 is a schematic diagram of a high-precision positioning system and module composition thereof based on edge cloud technology according to an embodiment of the disclosure.

The embodiment provides a positioning system and an implementation method based on edge cloud technology. As illustrated in FIGS. 4 and 5, public cloud is a public cloud server, edge cloud is an edge cloud server, and a terminal is a user terminal. The positioning system consists of a ground-based augmentation station network composed of reference stations distributed in a positioning service area, a high-precision positioning platform configured on the public cloud server, a location calculation platform configured on the edge cloud server and the user terminal. Among them, the high-precision positioning platform is responsible for calculating the differential correction model of the whole network according to the observation data of the ground-based augmentation station network, and matching the corresponding area correction model according to the service area of the edge cloud server for broadcasting. The edge cloud server performs high-precision location calculation on the user terminal according to the area correction model and the observation data of the user terminal.

In the embodiment, an edge cloud computing network which is closer to users in a networking structure and more flexible in service deployment is introduced into the system architecture, so that the system can not only meet the wide-area service coverage requirements, but also flexibly meet local, closed and mobile service scenarios (such as a mining area and a forest area).

The positioning method based on the edge cloud technology provided in the embodiment is implemented by the cooperation of the high-precision positioning platform on the public cloud server with the location calculation platform on the edge cloud server, and the system and module composition thereof is shown in FIG. 5.

On the public cloud side, the reference station network satellite observation data receiving module of the high-precision positioning platform is responsible for collecting respective satellite observation data packet of each station in the ground-based augmentation reference station network, calculating respective observation data of each reference station and transmitting the same to the differential correction model calculation module of the whole network. The whole network differential correction model calculation module divides the reference station network coverage area into grids, and generates respective differential correction model (including ionospheric and tropospheric models, etc.) of each grid based on the observation data of the reference station and the real coordinates thereof in the grid, and transmits the whole network differential correction model to the edge cloud service area matching module. A data broadcasting module is responsible for receiving a service area requirement uploaded by the location calculation platform of the edge cloud and transmitting the service area requirement to the service area matching module. The edge cloud service area matching module performs matching according to the edge cloud location service demand range and the grid area of the whole network, selects the grid correction data adjacent to the service area, calculates the differential correction model of a service demand area, and then transmits same to the data broadcasting module. The data broadcasting module sends the differential correction model of the service range required by the edge cloud to the edge cloud location calculation platform. The high-precision positioning platform may perform flexible match and calculation according to an actual location service area requirement of the edge cloud location calculation platform, thus improving the networking flexibility of the whole system.

On the edge cloud side, the area correction model acquiring module of the location calculation platform is responsible for uploading the required location service area to the high-precision positioning platform on the public cloud side, and acquiring the corresponding area correction model of the service demand area and transmitting the acquired area correction model to the terminal location calculation module. The terminal observation signal acquisition module is responsible for receiving a satellite signal observation value uploaded by the user terminal and then transmitting the received satellite signal observation value to the terminal location calculation module. The terminal location calculation module calculates the high-precision location information of the user terminal based on the area correction model and an original satellite observation signal of the user terminal, and then determines, according to a specific application requirement, whether to download the positioning information to the user terminal. Location calculation of the user terminal is performed at the location calculation platform on the edge cloud side, which may firstly reduce the physical transmission delay of acquiring the area differential correction model data from the high-precision platform on the public cloud server, and then may also ensure that the probability location of the user terminal is only transmitted in the edge cloud network, thus improving the privacy of users.

On the terminal side, since the user terminal does not need to perform location calculation, it can only needs to have a communication module and a satellite signal receiving module to obtain high-precision location information, thereby reducing the cost of the terminal and the complexity of software and hardware. The satellite signal receiving module is responsible for receiving a measurement satellite positioning and navigation signal, and the communication module is responsible for reporting the observation data to the location calculation platform on the edge cloud side and acquiring the positioning data.

Figure 6:
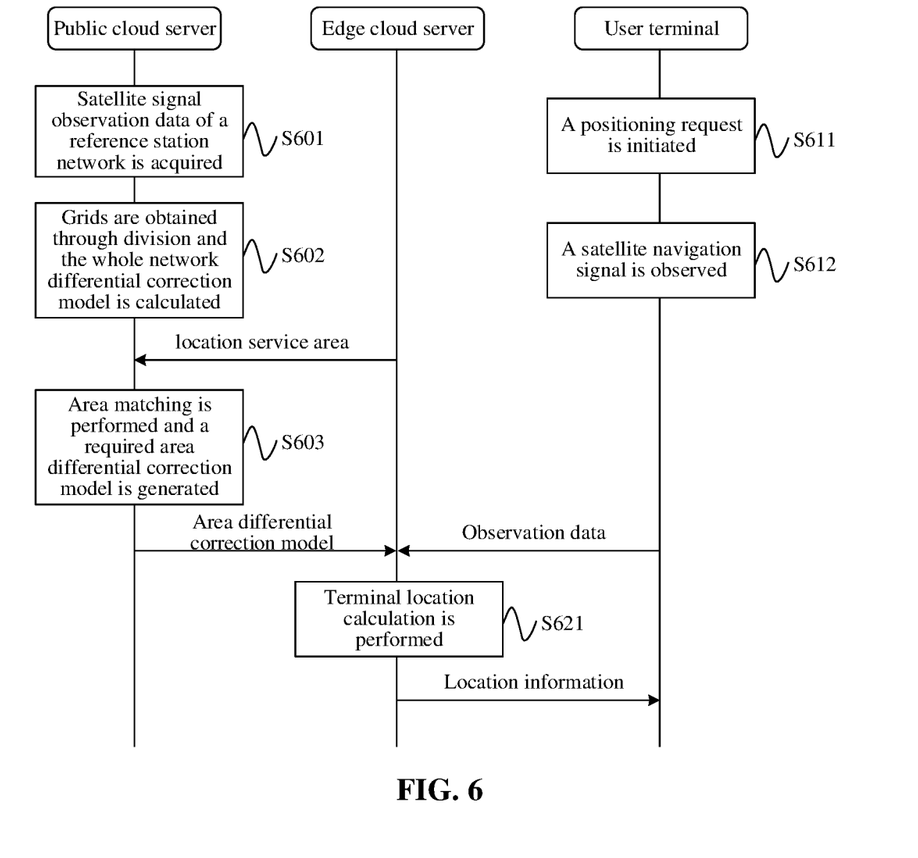
FIG. 6 is a flowchart of a high-precision positioning method based on edge cloud technology according to an embodiment of the disclosure.

FIG. 6 is a flowchart of a high-precision positioning method based on edge cloud technology according to an embodiment of the disclosure. As shown in FIG. 6, the positioning system provided in the embodiment includes: a public cloud server, at least one edge cloud server and at least one user terminal. In the embodiment, the number of public cloud servers, edge cloud servers and user terminals is not limited, and FIG. 6 is only an example.

In the above embodiment, the public cloud server generates the differential correction model of the whole network according to the observation data of the reference station network, and generates the differential correction model of a target area according to a service demand area of the edge cloud server and transmits the area differential correction model to the edge cloud server. The edge cloud server performs high-precision location calculation on the user terminal according to the satellite signal observation value of the user terminal and the difference correction model of the target area. The detailed steps are shown in FIG. 6. At S601, the high-precision positioning platform of the public cloud server receives the observation data of the reference station network; at S602, the high-precision platform divides the coverage area of the reference station network into a plurality of grids, and calculates respective differential correction model of each grid area; and at S603, the high-precision positioning platform matches the location service demand area uploaded by the edge cloud server with the grids, generates the differential correction model of the target area, and then transmits same back to the edge cloud server. At S611, the user terminal initiates a positioning request. At S612, the user terminal observes the satellite navigation signal and transmits an observation value to the edge cloud server. It is to be noted that steps 601 (602, 603) and steps 611 (612) are independent of each other and processed in parallel, which can accordingly improve the flexibility of system networking and reduce the time delay for users to acquire location services. At S621, after receiving the differential correction model and the observation value of the user terminal, the edge cloud server calculates the high-precision location information of the user terminal, and transmits the high-precision location information back to the user terminal.

The embodiments have the following beneficial effects.
1. High Flexibility
   a) In the embodiment, the location calculation platform on the edge cloud is adopted to provide a high-precision positioning service to the terminal, and the original high-precision positioning platform is fully decoupled from the terminal, thus improving the flexibility and portability of the whole positioning system.
2. Low Terminal Device Requirements
   a) The embodiment does not need a terminal device to provide a computing resource in hardware, which may reduce the implementation complexity and hardware cost of the terminal device and improve the convenience and portability of the terminal; and
   b) The embodiment does not need the terminal device to integrate a high-precision positioning algorithm in software, which may save the algorithm cost of the terminal device and further reduce the implementation complexity of the terminal device.
3. High User Privacy
   a) In the embodiment, the edge cloud receives approximate location information of the user terminal, which ensures that the user location information is only transmitted in a trusted network and system of the edge cloud, thus avoiding the leakage risk of user privacy data uploaded to the public cloud.
4. High Positioning Service Quality
   a) In the embodiment, the high-precision platform of the public cloud is adopted to push the differential correction model data within the area thereof to the location calculation platform on the edge cloud, which can reduce the time delay of the user terminal to acquire the differential correction service; and
   b) In the embodiment, the location calculation platform of the edge cloud calculates the location information of the terminal, which may improve the accuracy of the terminal positioning algorithm through richer computing resources on the edge cloud.

The edge cloud server, public cloud server, user terminal and system provided by the embodiment of the disclosure are introduced below, and the edge cloud server, public cloud server, user terminal and system described below may correspondingly refer to the user terminal positioning method described above.

Figure 7:
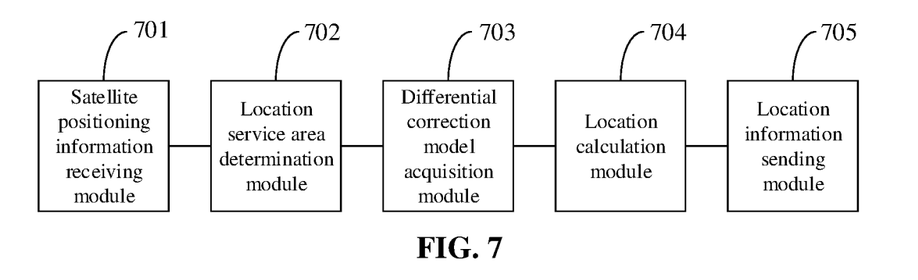
FIG. 7 is a structural schematic diagram of an edge cloud server according to an embodiment of the disclosure.

FIG. 7 is a structural schematic diagram of an edge cloud server according to an embodiment of the disclosure. As shown in FIG. 7, the edge cloud server includes: a satellite positioning information receiving module 701, a location service area determination module 702, a differential correction model acquisition module 703, a location calculation module 704, and a location information sending module 705.

The satellite positioning information receiving module 701 is configured to receive satellite positioning information from a user terminal.

The location service area determination module 702 is configured to determine a location service area where the user terminal is located.

The differential correction model acquisition module 703 is configured to acquire a differential correction model corresponding to the location service area from a public cloud server according to the location service area.

The location calculation module 704 is configured to perform location calculation using the satellite positioning information and the differential correction model to obtain the location information of the user terminal.

The location information sending module 705 is configured to send the location information to the user terminal.

Optionally, the differential correction model acquisition module 703 includes a location service area request sending unit and a differential correction model receiving unit.

The location service area request sending unit is configured to send a location service area request corresponding to the location service area to the public cloud server.

The differential correction model receiving unit is configured to receive a differential correction model corresponding to the location service area from the public cloud server.

Modules in the edge cloud server provided in FIG. 7 have the functions of implementing steps in the example shown in FIG. 1, and achieve the same technical effect as the user terminal positioning method shown in FIG. 1, which are not repeated here, for briefness of description.

Figure 8:
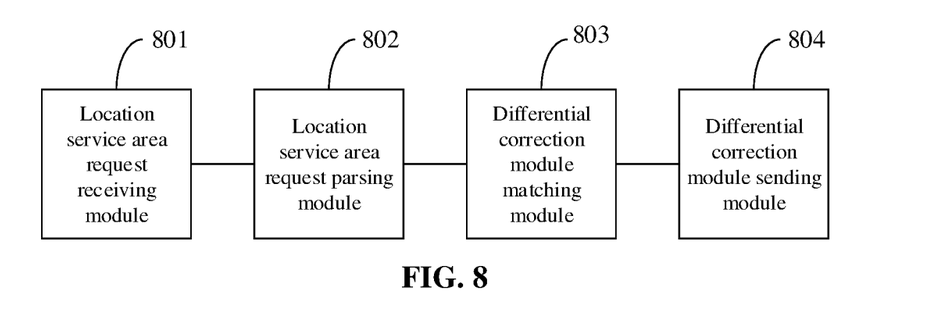
FIG. 8 is a structural schematic diagram of a public cloud server according to an embodiment of the disclosure.

The embodiments of the disclosure further provide a public cloud server. As shown in FIG. 8, the public cloud server includes: a location service area request receiving module 801, a location service area request parsing module 802, a differential correction model matching model 803, and a differential correction model sending module 804.

The location service area request receiving module 801 is configured to receive a location service area request from an edge cloud server.

The location service area request parsing module 802 is configured to parse the location service area request and determine a location service area corresponding to the location service area request.

The differential correction model matching model 803 is configured to match a differential correction model corresponding to the location service area according to the location service area.

The differential correction model sending module 804 is configured to send the differential correction model to the edge cloud server for the edge cloud server to determine the location information of a user terminal according to the differential correction model.

Optionally, the public cloud server further includes: a satellite observation data packet receiving module, a satellite observation data packet parsing module, a coverage area division module, and a differential correction model determination module.

The satellite observation data packet receiving module is configured to receive a satellite observation data packet from a ground-based augmentation reference station network.

The satellite observation data packet parsing module is configured to parse a satellite observation data packet and acquire respective observation data of each reference station in the ground-based augmentation reference station network.

The coverage area division module is configured to divide a coverage area of the ground-based augmentation reference station network to obtain a preset number of grid coverage areas.

The differential correction model determination module is configured to determine a differential correction model of any grid coverage area according to the observation data and accurate location coordinates of the reference station in the grid coverage area.

Optionally, the differential correction model matching module 803 includes a grid coverage area determination unit and a differential correction model matching unit.

The grid coverage area determination unit is configured to determine, based on the location service area, a grid coverage area to which the location service area belongs.

The differential correction model matching unit is configured to match the differential correction model corresponding to the location service area according to the grid coverage area to which the location service area belongs.

Modules in the public cloud server provided in FIG. 8 have the functions of implementing steps in the example shown in FIG. 2, and achieve the same technical effect as the user terminal positioning method shown in FIG. 2, which are not repeated here, for briefness of description.

Figure 9:
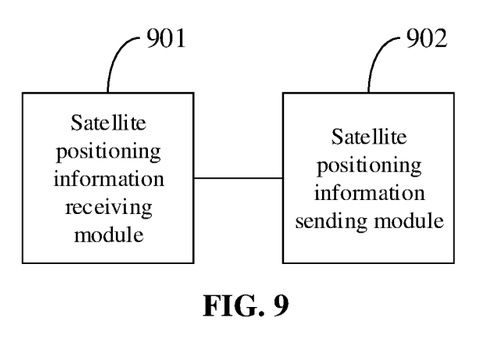
FIG. 9 is a structural schematic diagram of a user terminal according to an embodiment of the disclosure.

The embodiments of the disclosure further provide a user terminal. As shown in FIG. 9, the user terminal includes a satellite positioning information receiving module 901 and a satellite positioning information sending module 902.

The satellite positioning information receiving module 901 is configured to receive satellite positioning information from a satellite.

The satellite positioning information sending module 902 is configured to send the satellite positioning information to an edge cloud server to acquire location information of the user terminal.

Modules in the user terminal provided in FIG. 9 have the functions of implementing steps in the example shown in FIG. 3, and achieve the same technical effect as the user terminal positioning method shown in FIG. 3, which are not repeated here, for briefness of description.

The embodiments of the disclosure further provide a user terminal positioning system. The user terminal positioning system includes an edge cloud server, a public cloud server and a user terminal. Herein, the edge cloud server is configured to execute the user terminal positioning method in the above embodiment. The public cloud server is configured to execute the user terminal positioning method in the above embodiment. The user terminal is configured to execute the user terminal positioning method in the above embodiment.

It is to be noted that the disclosure is not to be limited to specific configurations and processing described above and shown in the figures. For brevity, detailed descriptions about known methods are omitted herein. A plurality of specific steps are described and shown in the above-mentioned embodiments as examples. However, the process of the method of the disclosure is not limited to the described and shown specific steps, and those skilled in the art may make various variations, modifications, and additions or change a sequence of the steps after understanding the spirit of the disclosure.

The function block shown in the structure block diagram may be implemented as hardware, software, firmware, or a combination thereof. When being implemented as hardware, the function block may be, for example, an electronic circuit, an ASIC, and suitable firmware, plug-in, and functional card. When being implemented as software, the element of the disclosure is a program or code segment for executing a required task. The program or code segment may be stored in a machine-readable medium, or transmitted on a transmission medium or communication link by a data signal contained in a carrier. The "machine-readable medium" may include any medium capable of storing or transmitting information. Examples of the machine-readable medium include an electronic circuit, a semiconductor memory device, a ROM, a flash memory, an Erasable ROM (EROM), a floppy disk, a Compact Disc ROM (CD-ROM), an optical disk, a hard disk, an optical fiber medium, an RF link, etc. The code segment may be downloaded through a computer network, such as the Internet and an intranet.

It is also to be noted that some methods or systems are described in the exemplary embodiments mentioned in the disclosure based on a series of steps or apparatuses. However, the disclosure is not limited to the sequence of the steps. That is, the steps may be executed according to the sequence mentioned in the embodiments, or a sequence different from that in the embodiments, or a plurality of steps may be executed at the same time.

It is to be understood that division of each module above is only logic function division, and the modules may be completely or partially integrated to a physical entity and may also be physically separated in actual implementation. And these modules may all be implemented in the form of software calling through processing elements and may all be implemented in the form of hardware. Also, partial modules may be implemented in the form of calling software by processing elements, and partial modules may be implemented in the form of hardware. For example, the determination module may be a separate processing element, and may also be integrated to a certain chip in the above apparatus for implementation. In addition, the determination module may also be stored in a memory of the above apparatus in the form of a program code, and called by a certain processing unit in the above apparatus to execute the functions of the above determination module. Implementation of other modules is similar thereto. Besides, these modules may completely or partially integrated together, and may also be independently implemented. The processing element herein may be an integrated circuit, and has a signal processing capability. During implementation, each step of the method or each unit may be completed by means of instructions in the form of an integrated logic circuit of hardware in the processing element or software.

For example, each module, unit, sub-unit or sub-module may be one or more integrated circuits configured to implement the above method, such as one or more Application-Specific Integrated Circuits (ASICs), or, one or more Digital Signal Processors (DSPs), or, one or more Field-Programmable Gate Arrays (FPGAs). For another example, when one of the above modules is implemented in the form of a processing element calling a program code, the processing element may be a general-purpose processor, such as a Central Processing Unit (CPU) or other processors that may call the program code. For yet another example, these modules may be integrated together and implemented in the form of System-On-a-Chip (SOC).

Terms "first", "second", etc., in the specification and claims of the disclosure are adopted not to describe a specific sequence or order but to distinguish similar objects. It is to be understood that data used like this may be interchanged as appropriate such that the embodiments of the disclosure described here may be implemented according to sequences in addition to those illustrated or described here, for example. In addition, terms "comprise", "comprising", "include", "including", "has", "having" or any other variations thereof, are intended to cover a non-exclusive inclusion. For example, a process, method, system, product or device that includes a list of steps or units is not necessarily limited to only those steps or units but may include other steps or units not expressly listed or inherent to such process, method, product or device. In addition, "and/or" used in the specification and claims represents at least one of the connected objects. For example, A and/or B and/or C represents the following seven cases: A alone, B alone, C alone, both A and B exist, both B and C exist, both A and C exist, and A, B and C all exist. Similarly, the use of "at least one of A and B" in the specification and claims shall be understood as "A alone, B alone, or both A and B exist".

The above is only the specific implementation mode of the disclosure. Those skilled in the art may clearly learn about that specific working processes of the system, module, and unit described above may refer to the corresponding processes in the method embodiment and will not be elaborated herein for ease and briefness of description. It is to be understood that the scope of protection of the present disclosure is not limited thereto. Any equivalent modifications or replacements apparent to those skilled in the art within the technical scope disclosed by the present disclosure shall fall within the scope of protection of the present disclosure.

What is claimed is:

1. A user terminal positioning method, performed by an edge cloud server, the method comprising:
   receiving satellite positioning information from a user terminal;
   determining a location service area where the user terminal is located;
   acquiring a differential correction model corresponding to the location service area from a public cloud server according to the location service area, wherein the differential correction model corresponding to the location service area is determined according to a differential correction model of a grid coverage area to which the location service area belongs, and the differential correction model of the grid coverage area to which the location service area belongs is determined according to observation data and location coordinates of a reference station in the grid coverage area;
   performing location calculation using the satellite positioning information and the differential correction model to obtain location information of the user terminal; and
   sending the location information to the user terminal.

2. The user terminal positioning method of claim 1, wherein acquiring the differential correction model corresponding to the location service area from the public cloud server according to the location service area comprises:
   sending a location service area request corresponding to the location service area to the public cloud server; and
   receiving the differential correction model corresponding to the location service area from the public cloud server.

3. A user terminal positioning method, performed by a public cloud server, the method comprising:
   receiving a location service area request from an edge cloud server;
   parsing the location service area request and determining a location service area corresponding to the location service area request;
   matching a differential correction model corresponding to the location service area according to the location service area, comprising:
      determining, based on the location service area, a grid coverage area to which the location service area belongs; and
      determining a differential correction model of the grid coverage area to which the location service area belongs to be the differential correction model corresponding to the location service area, wherein the differential correction model of the grid coverage area to which the location service area belongs is determined according to observation data and location coordinates of a reference station in the grid coverage area; and
   sending the differential correction model to the edge cloud server such that the edge cloud server determines location information of a user terminal according to the differential correction model.

4. The user terminal positioning method of claim 3, further comprising: before matching the differential correction model corresponding to the location service area according to the location service area,
   receiving a satellite observation data packet from a ground-based augmentation reference station network;
   parsing the satellite observation data packet to obtain respective observation data of each reference station in the ground-based augmentation reference station network;
   dividing a coverage area of the ground-based augmentation reference station network to obtain a preset number of grid coverage areas; and
   determining a differential correction model of any grid coverage area according to observation data and accurate-location coordinates of a reference station in the grid coverage area.

5. An edge cloud server, comprising:
   a processor; and
   a memory storing instructions executable by the processor;
   wherein the processor is configured to:
   receive, through a transceiver, satellite positioning information from a user terminal;
   determine a location service area where the user terminal is located;
   acquire a differential correction model corresponding to the location service area from a public cloud server according to the location service area, wherein the differential correction model corresponding to the location service area is determined according to a differential correction model of a grid coverage area to which the location service area belongs, and the differential correction model of the grid coverage area to which the location service area belongs is determined according to observation data and location coordinates of a reference station in the grid coverage area;
   perform location calculation using the satellite positioning information and the differential correction model to obtain location information of the user terminal; and
   send, through the transceiver, the location information to the user terminal.

6. The edge cloud server of claim 5, wherein the processor is further configured to:

send, through the transceiver, a location service area request corresponding to the location service area to the public cloud server; and receive, through the transceiver, the differential correction model corresponding to the location service area from the public cloud server.

7. A user terminal positioning system, comprising:

an edge cloud server, configured to execute the user terminal positioning method of claim 1;

a public cloud server, configured to:
  receive a location service area request from the edge cloud server;
  parse the location service area request and determining a location service area corresponding to the location service area request;
  match a differential correction model corresponding to the location service area according to the location service area; and
  send the differential correction model to the edge cloud server such that the edge cloud server determines location information of a user terminal according to the differential correction model; and the user terminal, configured to: receive satellite positioning information from a satellite, and send the satellite positioning information to the edge cloud server to acquire location information of the user terminal, wherein the public cloud server is further configured to:
  determine, based on the location service area, a grid coverage area to which the location service area belongs; and
  determine a differential correction model of the grid coverage area to which the location service area belongs to be the differential correction model corresponding to the location service area, wherein the differential correction model of the grid coverage area to which the location service area belongs is determined according to observation data and location coordinates of a reference station in the grid coverage area.

* * * * *